US010292880B2

(12) United States Patent
Chang

(10) Patent No.: US 10,292,880 B2
(45) Date of Patent: May 21, 2019

(54) TRANSPORT AID

(71) Applicant: SOLID FOCUS INDUSTRIAL CO., LTD., Taoyuan (TW)

(72) Inventor: Shao-Tuan Chang, Taoyuan (TW)

(73) Assignee: SOLID FOCUS INDUSTRIAL CO., LTD., Taoyuan (TW)

( * ) Notice: Subject to any disclaimer, the term of this patent is extended or adjusted under 35 U.S.C. 154(b) by 0 days.

(21) Appl. No.: 15/866,549

(22) Filed: Jan. 10, 2018

(65) Prior Publication Data

US 2018/0369032 A1 Dec. 27, 2018

(30) Foreign Application Priority Data

Jun. 26, 2017 (TW) ............................. 106121280 A

(51) Int. Cl.
*B62B 3/00* (2006.01)
*A61G 5/08* (2006.01)
*A61H 3/04* (2006.01)

(52) U.S. Cl.
CPC ................ *A61G 5/08* (2013.01); *A61H 3/04* (2013.01); *A61H 2003/046* (2013.01); *A61H 2201/0161* (2013.01)

(58) Field of Classification Search
CPC ... A61G 5/00; A61G 5/08; A61G 5/10; A61G 5/1002; A61G 5/14; A61G 5/125; A61G 5/128; A61G 7/10; A61G 7/1017; A61G 7/053; A61G 7/1007; A61G 7/1038; A61G 7/1059; A61H 3/00; A61H 3/04
See application file for complete search history.

(56) References Cited

U.S. PATENT DOCUMENTS

| | | | | | | |
|---|---|---|---|---|---|---|
| 4,266,305 | A | * | 5/1981 | Kavaloski | A61G 5/1002 | 297/353 |
| 4,399,572 | A | * | 8/1983 | Johansson | A61G 7/1019 | 5/87.1 |
| 4,888,833 | A | * | 12/1989 | Garcia | A47K 11/04 | 4/480 |
| 5,255,934 | A | * | 10/1993 | Wilson | A61G 5/045 | 180/907 |
| 5,380,034 | A | * | 1/1995 | Wilson | A61G 5/006 | 280/30 |

(Continued)

*Primary Examiner* — James M Dolak
(74) *Attorney, Agent, or Firm* — Bacon & Thomas, PLLC

(57) ABSTRACT

The present disclosure illustrates a transport aid which can be quickly assembled, disassembled, and adjusted in width, and includes two support members, a chair seat and two horizontal assembly frames, wherein the horizontal assembly frames are disposed on left and right sides of the chair seat, respectively, and each includes a first quick connector assembled to a corresponding second quick connector of the chair seat, and ends of the two horizontal assembly frames are pivotally connected to corresponding support members, respectively, and other ends of the two horizontal assembly frames are assembled to each other through a quick packing connector for forming a horizontal bottom support member. As a result, the transport aid can be quickly disassembled into members for easy carry; furthermore, these members can be quickly assembled to a transport aid as a wheelchair, so that any person with disability can sit thereon and easily and comfortably be transported.

10 Claims, 5 Drawing Sheets

(56) References Cited

U.S. PATENT DOCUMENTS

| | | | | | |
|---|---|---|---|---|---|
| 5,568,933 | A * | 10/1996 | Mizuno | A61G 5/08 | 280/250.1 |
| 5,704,439 | A * | 1/1998 | Kitahama | A61G 5/042 | 180/6.5 |
| 6,161,229 | A * | 12/2000 | Ryan | A61G 5/14 | 297/DIG. 10 |
| 6,217,057 | B1 * | 4/2001 | Kitchen | A61G 5/00 | 280/47.38 |
| 6,308,981 | B1 * | 10/2001 | Proehl | A61G 7/1017 | 280/47.34 |
| 6,547,265 | B1 * | 4/2003 | Enge | A61G 5/1002 | 135/66 |
| 7,039,964 | B2 * | 5/2006 | Cavanagh | A61G 7/1007 | 4/246.1 |
| 8,646,124 | B2 * | 2/2014 | Stryker | A61G 5/1059 | 5/81.1 R |

* cited by examiner

TRANSPORT AID

FIELD OF THE INVENTION

The present disclosure relates to a transport aid. More particularly, the present disclosure relates to a transport aid which can be quickly disassembled, assembled, and adjusted in width. The transport aid of the present disclosure can be disassembled to multiple members including a left support member, a right support member, a chair seat and two horizontal assembly frames, to facilitate a user to carry, stow and transport; furthermore, these members can be quickly assembled as a transport aid similar to a wheelchair, and the transport aid can be quickly adjusted in sitting height and width, and in a location and an angle and a headrest thereof, upon a sitting person's demand, so that the transport aid of the present disclosure can be applicable to a tall, short, fat, or thin person with disability to sit thereon conveniently and comfortably; furthermore, a retractable mechanism disposed inside the left support member and right support member can adjust lengths of first cable belts or ropes exposed out of bottom sides of the left armrest part and the right armrest part, so that by swinging the chair seat which is suspended under the first cable belts or ropes, the person with disability sitting on the chair seat can be transported from an original location to a desired location accurately.

BACKGROUND OF THE INVENTION

Generally, a transport aid is used to assist a care giver to transport a cared person which is unable or hard to move independently and also called a person with disability, so as to reduce the mental and physical burden on the care giver.

In order to satisfy care market demand, there are available transport aids in market disclose conventional transport aids. Each of the conventional transport aids can assist the care giver to transport the person with disability and can be folded for receiving, but the problem is that the folded transport aid still takes up a lot of space, so the user is not easy to carry, stow and transport. Furthermore, when the conventional transport aid is unfolded to use, a sitting height and width of the conventional transport aid and a location and an angle of the headrest of the conventional transport aid cannot be adjusted, so the conventional transport aid cannot be applicable to practical demand of the tall, short, fat or thin person with disability. More particularly, when the care giver wants to use the conventional transport aid to transport the person with disability from an original location to a desired location, the care giver must manually move the cared person from the original location to the transport aid, and then push the transport aid to a location adjacent to the desired location, and again manually lift the cared person from the transport aid to the desired location, thereby completing entire transport procedure and process. However, the conventional transport aid cannot efficiently reduce mental and physical burden on the care giver who must manually move or lift the person with disability in the transport procedure and process.

For this reason, what is need is to develop a transport aid which can be quickly disassembled, assembled, and adjusted in width. Furthermore, the transport aid can be disassembled to members including a left support member, a right support member, a chair seat and two horizontal assembly frames, so as to facilitate a user to carry, stow and transport; furthermore, these members can be assembled as a transport aid similar to a wheelchair, and the transport aid can be quickly adjusted in sitting height and width, and in a position and an angle and a headrest thereof, upon a sitting person's demand, so that the transport aid of the present disclosure can be applicable to a tall, short, fat, or thin person with disability to sit thereon conveniently and comfortably; furthermore, the transport aid of the present disclosure includes a retractable mechanism disposed inside the left support member and right support member to adjust lengths of first cable belts or ropes exposed out of bottom sides of the left armrest part and the right armrest part; as a result, by swinging the chair seat which is suspended under the first cable belts or ropes, the person with disability sitting on the chair seat can be transported from the original location to the desired location accurately.

SUMMARY OF THE INVENTION

In order to solve above-mentioned problem, the inventor develops a transport aid which can be assembled and disassembled, and adjusted in width, according to years of practical development experience and multiple tests. By using the transport of the present disclosure, the mental and physical burden on the care giver can be reduced when the care giver transports a person with disability; furthermore, by using the transport aid of the present disclosure, the person with disability can accurately swing from an original location to a desired position independently.

According to an embodiment, the present disclosure provides a transport aid which can be assembled and disassembled, and adjusted in width. The transport aid includes a left support member, a right support member, a chair seat and two horizontal assembly frames. The left support member is formed by welding a plurality of metal tubes, and includes a left armrest part and a left roller part. The left armrest part is disposed on a top edge of the left support member, and includes a top side configured to place a sitting person's left hand, a retractable mechanism disposed inside, and a rotatable connector pivotally connected to an inner side or an outer side thereof adjacent to a front end thereof and engaged with an end of a rotatable handle. When the rotatable connector is rotated, the retractable mechanism is driven to retrieve two first cable belts or ropes exposed out of a bottom side of the left armrest part, into the left armrest part, and the exposed parts of the two first cable belts or ropes become longer, or when the rotatable connector is rotated, the retractable mechanism is driven to release the two cable belts or ropes from the left armrest part, the exposed parts of the two first cable belts or ropes become shorter. Each of the plurality of first cable belts or ropes of the left armrest part includes a first quick connector disposed at an end thereof away from the left armrest part. The left roller part is integrally formed by welding a plurality of metal tubes, and includes rollers pivotally connected to a bottom side thereof adjacent to a front end and a rear end thereof, and includes a top side connected to the bottom side of the left armrest part by a plurality of vertical support rods, so that the left roller part and the left armrest part are spaced apart from each other by a predetermined vertical distance. The right support member formed by welding and assembling a plurality of metal tubes, and includes a right armrest part and a right roller part. The right armrest part is disposed on a top edge of the right support member, and includes a top side configured to place the sitting person's right hand, other retractable mechanism disposed inside, and other rotatable connector pivotally connected to an inner side or an outer side thereof adjacent to a front end thereof and engaged with an end of other rotatable handle. When the other rotatable connector is rotated, the other retractable mechanism is driven to retrieve two first cable belts or ropes exposed out of a bottom side of the right armrest part, into the right armrest part, and the exposed parts of the two first cable belts or ropes become shorter, or when the other rotatable connector is rotated, the other retractable mechanism is driven to release the two cable belts or ropes from the right armrest part, the exposed parts of the two first cable belts or ropes become longer. Each of the plurality of first cable belts or ropes of right armrest part includes a first quick connector disposed at an end thereof away from the right armrest part. The right roller part is integrally formed by welding a plurality of metal tubes, and includes other rollers pivotally connected to a bottom side thereof adjacent to a front end and a rear end thereof, and includes a top side connected to the bottom side of the right armrest part by a plurality of vertical support rods, so that the right roller part and the right armrest part are spaced apart from each other by the predetermined vertical distance. The chair seat includes second cable belts or ropes respectively disposed at left and right sides thereof adjacent to front and rear edges thereof, and each of the plurality of second cable belts or ropes includes a second quick connector disposed at an end thereof away from the chair seat and configured to integrally engage with one of the first quick connectors corresponding thereto, so that the chair seat is swingably suspended between and below the left armrest part and the right armrest part stably. The two horizontal assembly frames are formed by welding at least one metal tube, and include ends pivotally connected with parts of the vertical support rods which are adjacent to bottoms of the vertical support rods, and respectively between the left armrest part and the left roller part, and between the right armrest part and the right roller part. Other ends of the horizontal assembly frames are mounted with each other, and tightly packed by a quick packing connector PC, so that the horizontal assembly frames are assembled and combined with each other to form a horizontal bottom support member.

As a result, the transport aid of the present disclosure can be disassembled to multiple members including the left support member, the right support member, the chair seat and the two horizontal assembly frames, to facilitate a user to carry, stow and transport; furthermore, these members can be quickly assembled as a transport aid similar to a wheelchair, and the transport aid can be quickly adjusted in sitting height and width, and in a location and an angle and a headrest thereof, upon a sitting person's demand, so that the transport aid of the present disclosure can be applicable to a tall, short, fat, or thin person with disability to sit thereon conveniently and comfortably; furthermore, a retractable mechanism disposed inside the left support member and right support member can adjust lengths of first cable belts or ropes exposed out of bottom sides of the left armrest part and the right armrest part, so that by swinging the chair seat which is suspended under the first cable belts or ropes, the person with disability sitting on the chair seat can be transported from the original location to the desired location accurately.

BRIEF DESCRIPTION OF THE DRAWINGS

The structure, operating principle and effects of the present disclosure will be described in detail by way of various embodiments which are illustrated in the accompanying drawings.

DETAILED DESCRIPTION OF THE PREFERRED EMBODIMENTS

Figure 1:
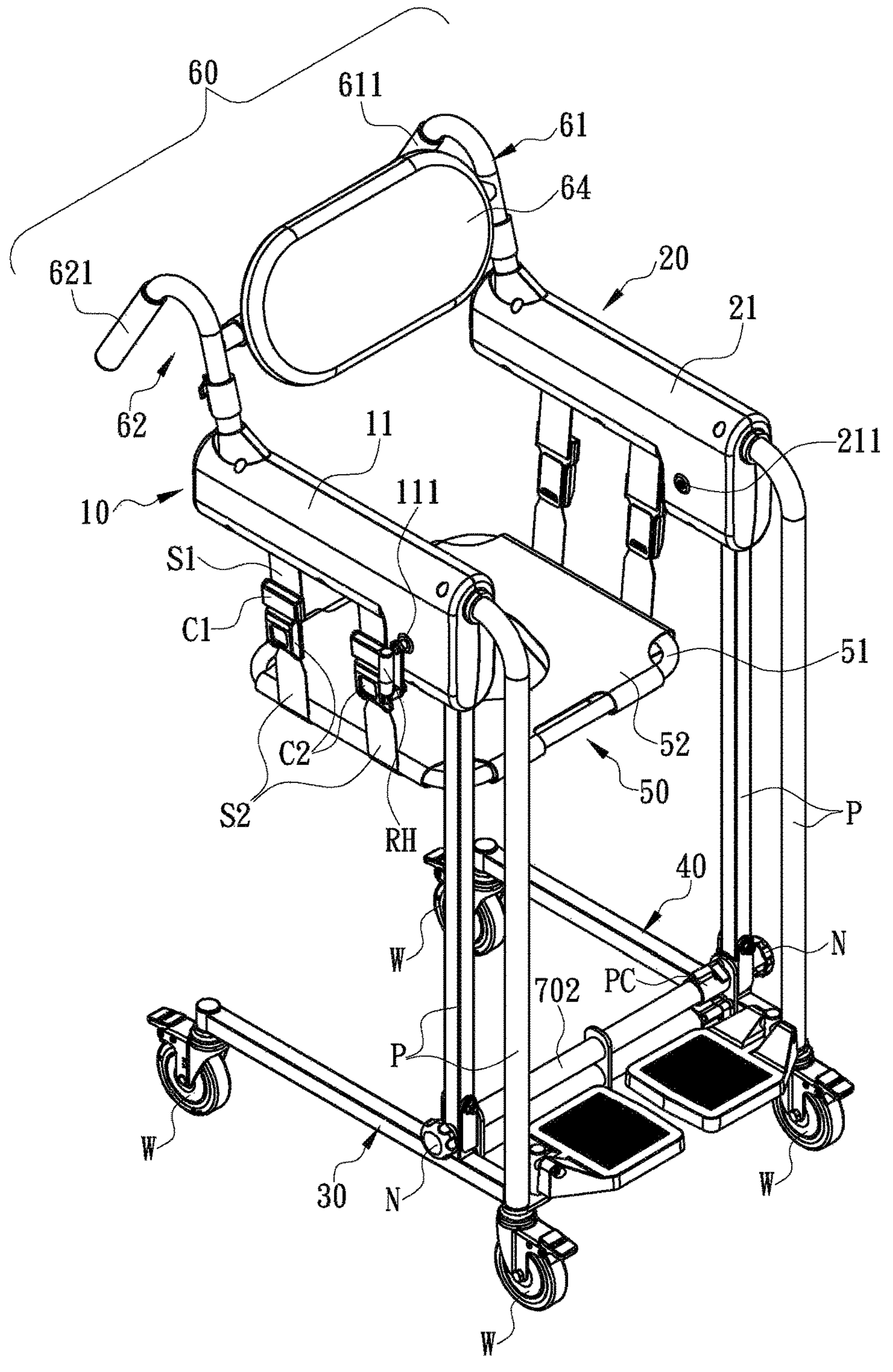
FIG. 1 is a front perspective view of a transport aid of the present disclosure.

The following embodiments of the present invention are herein described in detail with reference to the accompanying drawings. These drawings show specific examples of the embodiments of the present invention. It is to be understood that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present invention. As used herein, the term "or" includes any and all combinations of one or more of the associated listed items.

Figure 2:
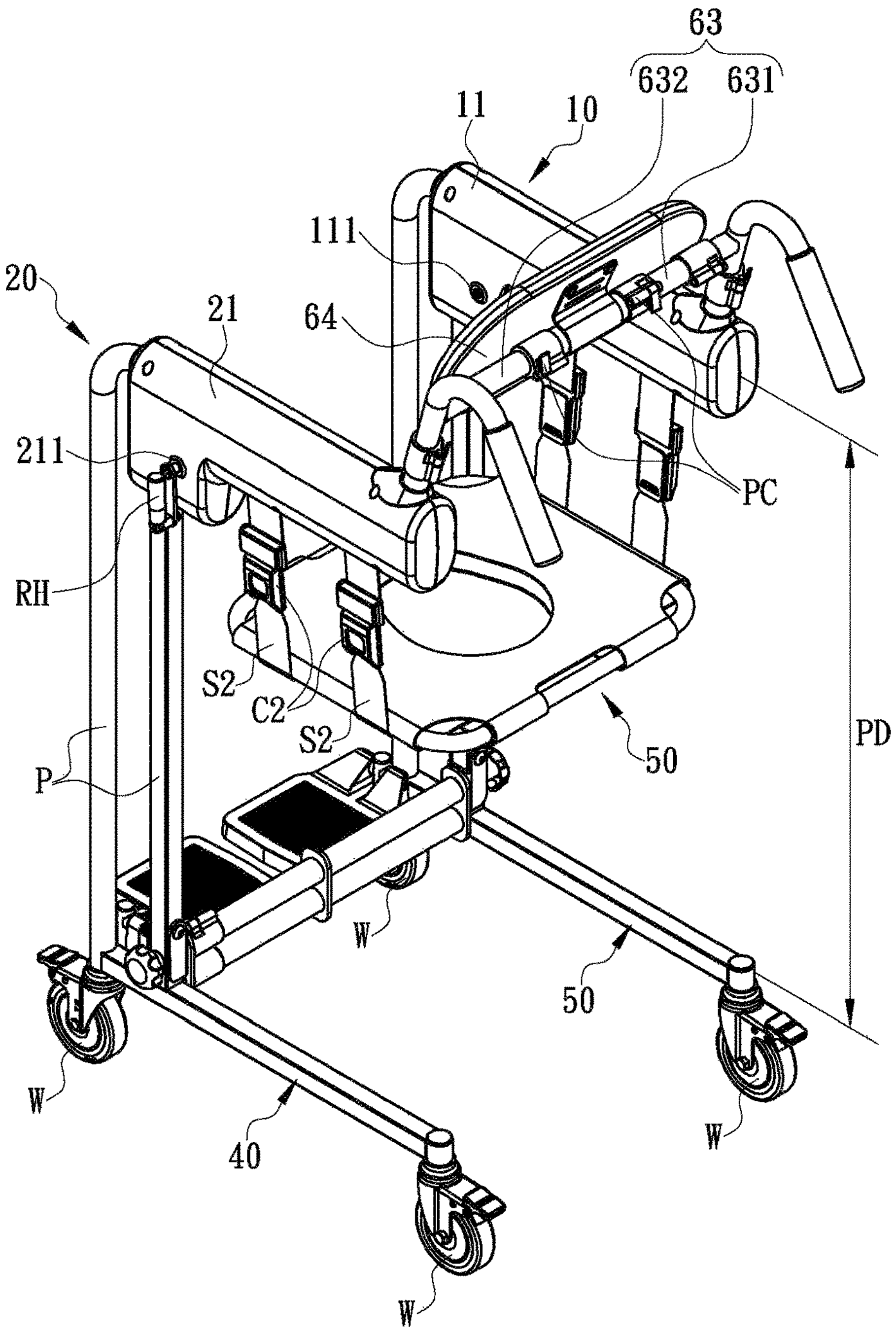
FIG. 2 is a back perspective view of the transport aid of the present disclosure.
Figure 3:
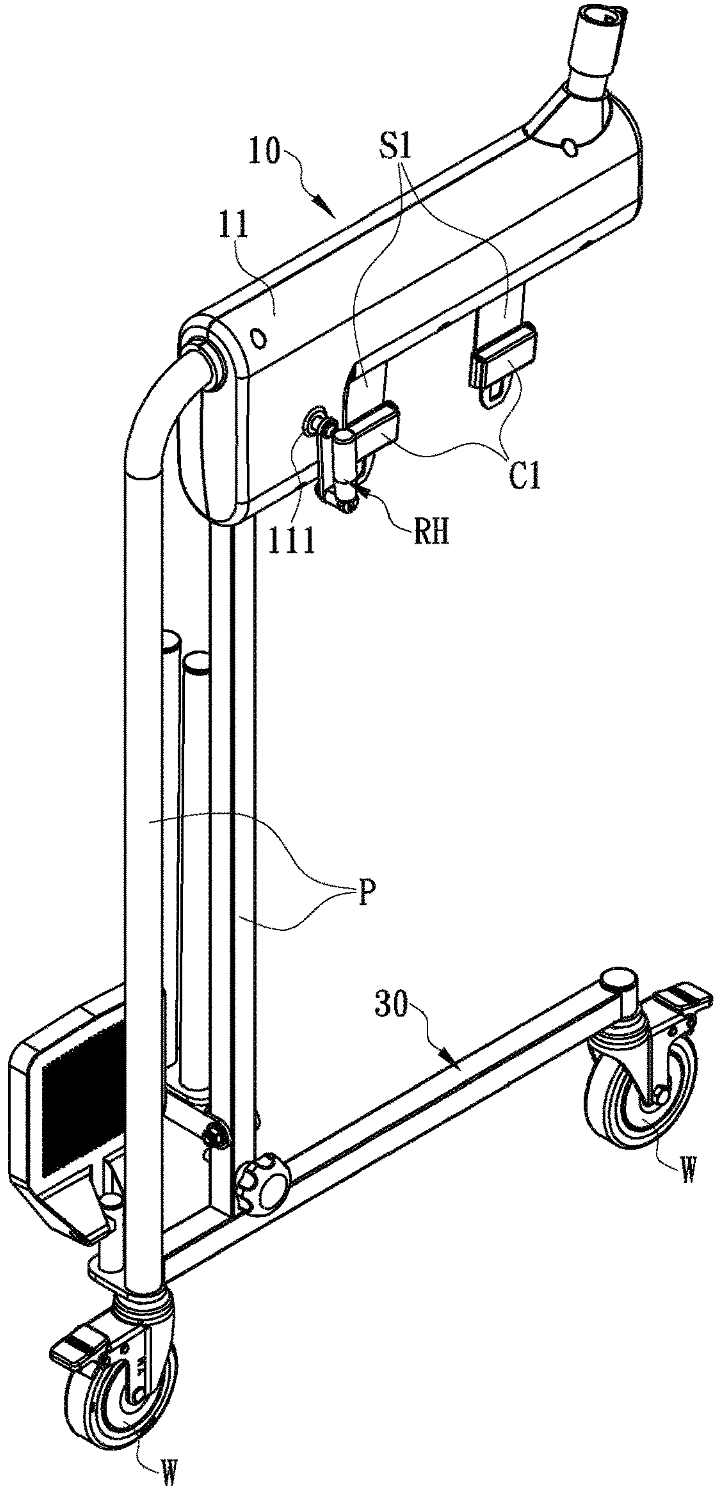
FIG. 3 is a front perspective view of a left support member of the transport aid of the present disclosure.

Please refer to FIGS. 1 and 2, which shows a transport aid which can be quickly assembled and disassembled, and adjusted in width, in accordance with the present disclosure. The transport aid includes a left support member 10, a right support member 20, a chair seat 50, a headrest support member 60, and two horizontal assembly frames 701 and 702 shown in FIG. 5 which is an exploded view of the transport aid. Please refer to FIG. 3. The left support member 10 is formed by welding a plurality of metal tubes, and includes a left armrest part 11 and a left roller part 30. The left armrest part 11 is disposed at a top of the left support member 10, and the person sitting on the transport aid can place left hand on a top side of the left armrest part 11. The sitting person may be a cared person, and is unable or hard to move independently, and is also called a person with disabilities. The left armrest part 11 includes a retractable mechanism (not shown in figures) disposed inside, and a rotatable connector 111 pivotally connected to a position on an inner side or an outer side thereof adjacent to a front end thereof. An end of a rotatable handle RH is engaged with the rotatable connector 111. Under a condition that the rotatable connector 111 is rotated, the retractable mechanism is driven to gradually retrieve two first cable belts or ropes S1, which are exposed out of the bottom side of the left armrest part 11, into the left armrest part 11, or gradually release the two first cable belts or ropes S1 from bottom side of the left armrest part 11. When the two first cable belts or ropes S1 are retrieved, lengths of the two first cable belts or ropes S1 exposed out of the left armrest part 11 become shorter, and when the two first cable belts or ropes S1 are released, lengths of the two first cable belts or ropes S1 exposed out of the left armrest part 11 become longer. Each of the two first cable belts or ropes S1 has a first quick connector C1 disposed at an end thereof away from the left armrest part 11. The left roller part 30 is formed integrally by welding a plurality of metal tubes. A top side of the left roller part 30 is connected to the bottom side of the left armrest part 11 by a plurality of vertical support rods P, so that the left roller part 30 and the left armrest part 11 are connected integrally with each other but spaced apart from each other by a predetermined vertical distance PD. The left roller part 30 includes rollers W pivotally connected to positions on bottom side thereof adjacent to a front end and a rear end thereof, respectively.

Please refer back to FIGS. 1 and 2. The right support member 20 is formed by welding a plurality of metal tubes, and the right support member 20 includes a right armrest part 21 and a right roller part 40. The right armrest part 21 is disposed at a top side of the right support member 20, and the person sitting on the chair seat 50 can place right hand on the top side of the right armrest part 21. The right armrest part 21 also includes a retractable mechanism disposed inside, and a rotatable connector 211 pivotally connected to a position on inner side or an outer side thereof adjacent to a front end thereof. A rotatable handle RH is engaged with the rotatable connector 211 by an end thereof. Under a condition that the rotatable connector 211 is rotated, the retractable mechanism is driven to gradually retrieve two first cable belts or ropes S1, which are exposed out of the bottom side of the right armrest part 21, into the right armrest part 21, or gradually release the two first cable belts or ropes S1 from bottom side of the right armrest part 21. When the two first cable belts or ropes S1 are retrieved, lengths of the two first cable belts or ropes S1 exposed out of the right armrest part 21 become shorter, and when the two first cable belts or ropes S1 are released, lengths of the two first cable belts or ropes S1 exposed out of the right armrest part 21 become longer. Each of the two first cable belts or ropes S1 has a first quick connector C1 disposed at an end thereof away from the right armrest part 21. The right roller part 40 is formed integrally by welding a plurality of metal tubes. A top side of the right roller part 40 is connected to the bottom side of the right armrest part 21 by a plurality of vertical support rods P, so that the right roller part 40 and the right armrest part 21 are connected integrally with each other but spaced apart from each other by a predetermined vertical distance PD. The right roller part 40 includes rollers W pivotally connected to positions on a bottom side thereof adjacent to a front end and a rear end thereof, respectively.

Please refer back to FIGS. 1 and 2. The chair seat 50 includes at least four second cable belts or ropes S2 respectively disposed at positions on left and rights side thereof adjacent to a front side and a rear side thereof. Each of the plurality of second cable belts or ropes S2 includes a second quick connector C2 disposed on an end thereof away from the chair seat 50. The second quick connector C2 can be quickly engaged with the first quick connector C1 corresponding thereto, so that the chair seat 50 can be swingably suspended between and below the left armrest part 11 and the right armrest part 21 stably.

Figure 4:
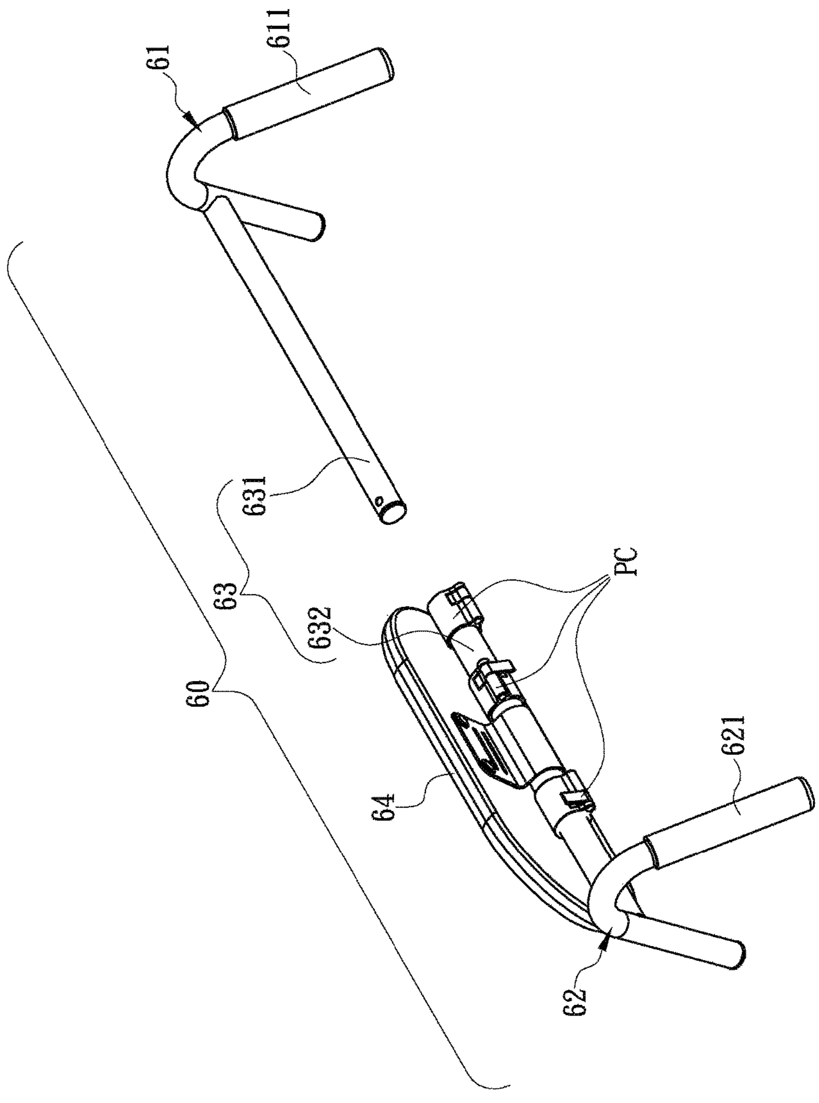
FIG. 4 is a back perspective view of a headrest support member of the transport aid of the present disclosure.

Please refer to FIGS. 1, 2 and 4. The headrest support member 60 is formed by welding a plurality of metal tubes, and includes a left handle part 61, a right handle part 62, two horizontal handle assembly rods 631 and 632, and a headrest 64. An end of the left handle part 61 is detachably assembled with the top side of the left armrest part 11 adjacent to the rear end of the left armrest part 11, and other end of the left handle part 61 is bent backwardly and downwardly to form a left handle 611, so that the transporter (such as a care giver) can hold the left handle 611 by left hand. An end of the right handle part 62 is detachably assembled with the top side of the right armrest part 21 adjacent to the rear end of the right armrest part 21, and other end of the right handle part 62 is bent backwardly and downwardly to form a right handle 621, so that the transporter can hold the right handle 621 by right hand. Ends of the horizontal handle assembly rods 631 and 632 are respectively welded on near-center sections of the left handle part 61 and the right handle part 62, and other ends of the horizontal handle assembly rods 631 and 632 are mounted with each other, and a quick packing connector PC is used to exert packing force on the horizontal handle assembly rods 631 and 632, thereby assembling a horizontal headrest support rod 63 which is configured to improve assembly strength between the left support member 10 and the right support member 20, and make a width between the left support member 10 and the right support member 20 adjustable; as a result, the transport aid of the present disclosure can be applicable to a tall, short, fat, or thin person with disability. The headrest 64 includes at least one quick packing connector disposed at a back surface thereof, and the quick packing connector PC is mounted and tightly packed with the horizontal headrest support rod 63, to adjust a position and angle of the headrest 64 relative to the horizontal headrest support rod 63, so that the sitting person's head can lie on a top surface of the headrest 64 comfortably. After the left support member 10, the right support member 20, the chair seat 50 and the headrest support member 60 are assembled integrally to form the transport aid of the present disclosure, the transport aid has a basic structure and function the same as general wheelchair.

Figure 5:
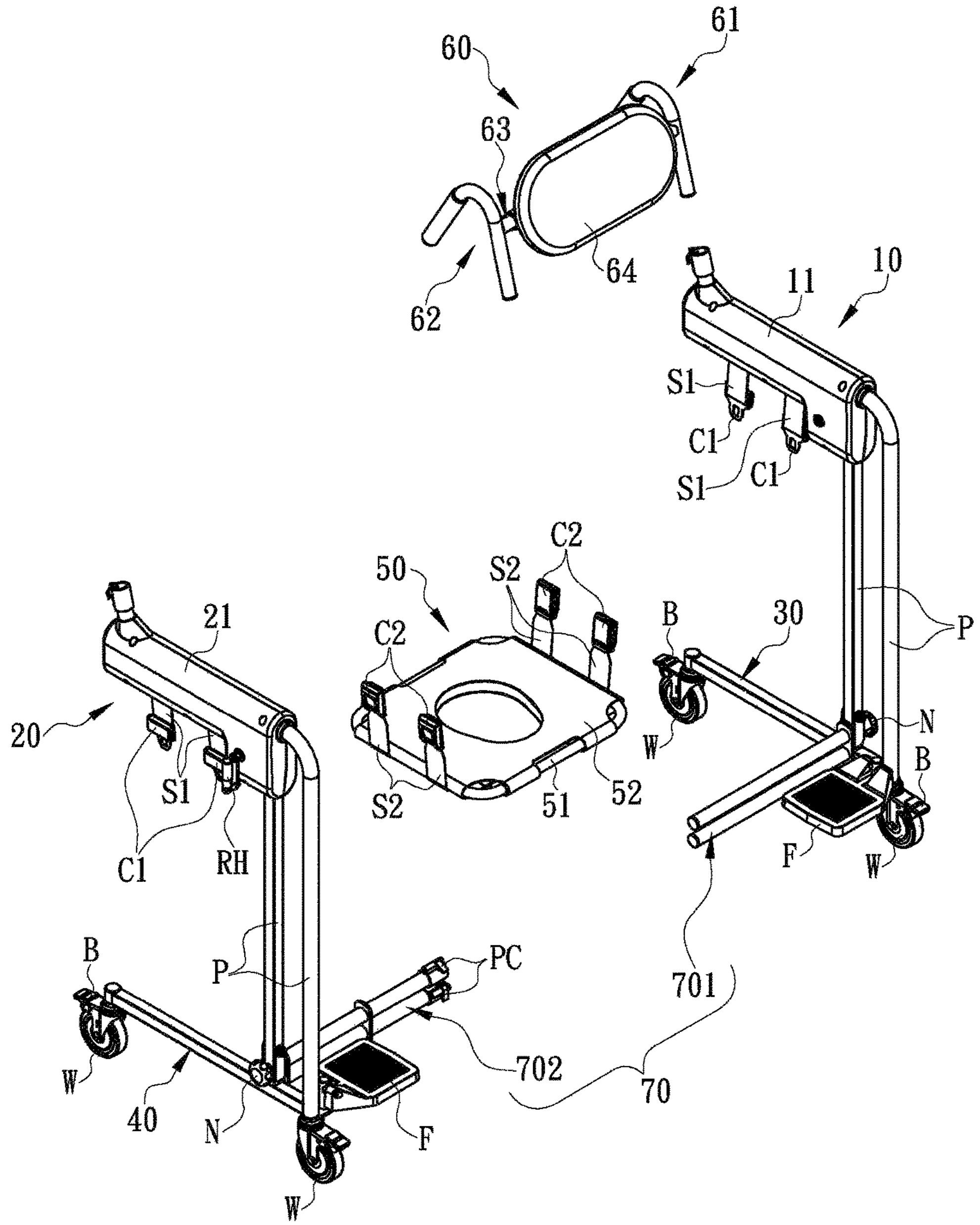
FIG. 5 is an exploded diagram of the transport aid of the present disclosure.

Please refer to FIGS. 1 and 5. Each of the horizontal assembly frames 701 and 702 can be formed by welding at least one metal tube. Ends of the horizontal assembly frames 701 and 702 are pivotally connected with parts of the vertical support rods P adjacent to bottoms of the vertical support rods P, and respectively between the left armrest part 11 and the left roller part 30, and between the right armrest part 21 and the right roller part 40. Other ends of the horizontal assembly frames 701 and 702 are mounted with each other, and tightly packed by a quick packing connector PC, so that the horizontal assembly frames 701 and 702 can be assembled and combined with each other to form a horizontal bottom support member 70. The horizontal bottom support member 70 is configured to improve the assembly strength between the left support member 10 and the right support member 20, and make the width between the left support member 10 and the right support member 20 adjustable, so that the transport aid of the present disclosure can be applicable to tall, short, fat and thin person with disability.

Please refer back to FIGS. 1, 2 and 5. In other embodiment of the present disclosure, the transport aid may include two pedals F which are pivotally connected to inner sides of the left roller part 30 and the right roller part 40 adjacent to front edges of the left roller part 30 and the right roller part 40, respectively. The person sitting on the transport aid can place and position feet on the pedals F, respectively. When the pedals F are not in use, the pedals F can be respectively flipped to attach with the inner sides of the left roller part 30 and the right roller part 40, thereby releasing the space occupied by the pedals F, for the sitting person. Otherwise, the pedals F can be respectively flipped to unfold for immediate use.

Please refer back to FIGS. 1, 2 and 5. In other embodiment of the present disclosure, the rollers W may include a brake mechanism configured to stop rotation of the roller W, so that the transport aid can be stably positioned at a desired location.

Please refer back to FIGS. 1, 2 and 5. In other embodiment of the present disclosure, in order to improve performance and convenience in use, the chair seat 50 may include a hollow frame 51 and a covering layer 52. The hollow frame 51 is formed by a bent metal tube; and, the covering layer 52 can be made of textile, to facilitate washing to keep clean and comfortable. The covering layer 52 covers an outer edge of the hollow frame 51, and ends of the second cable belts or ropes S2 are respectively sewn with left and right sides of the covering layer 52 adjacent to front and rear edges of the covering layer 52. The second quick connectors C2 are respectively fixed with the other ends of the plurality of second cable belts or ropes S2. After each of the second quick connectors C2 is integrally connected with one of the first quick connectors C1 corresponding thereto, the chair seat 50 can swingably suspend between and below the left armrest part 11 and the right armrest part 21 stably through the first and second cable belts or ropes S1 and S2.

Please refer back to FIGS. 1, 2 and 5, In other embodiment of the present disclosure, the transport aid may include locking buttons N respectively disposed on the vertical support rod P adjacent to the bottom of the vertical support rod P, and between the left armrest part 11 and the left roller part 30, and between the right armrest part 21 and the right roller part 40. The user can rotate each of the locking buttons N to lock and position one of the horizontal assembly frames 701 and 702 corresponding thereto at a horizontally-assembled status, so as to improve stability and security of the assembled horizontal assembly frames 701 and 702; or, when the horizontal assembly frames 701 and 702 are vertically attached with the vertical support rods P corresponding thereto respectively, the user can rotate each of the locking buttons N to lock and position the horizontal assembly frames 701 and 702. As a result, after the transport aid is disassembled, the horizontal assembly frames 701 and 702 can occupy less space.

The present disclosure disclosed herein has been described by means of specific embodiments. However, numerous modifications, variations and enhancements can be made thereto by those skilled in the art without departing from the scope of the invention set forth in the claims.

What is claimed is:

1. A transport aid with a quick assembly-disassembly function and a width adjustment function, comprising:

a left support member formed by welding a plurality of metal tubes, comprising:

a left armrest part disposed on a top edge of the left support member, and comprising a top side configured to place a sitting person's left hand, a retractable mechanism disposed inside, a rotatable connector pivotally connected to an inner side or an outer side thereof adjacent to a front end thereof and engaged with an end of a rotatable handle, wherein when the rotatable connector is rotated, the retractable mechanism is driven to retrieve two first cable belts or ropes exposed out of a bottom side of the left armrest part, into the left armrest part, and the exposed parts of the two first cable belts or ropes become longer, or when the rotatable connector is rotated, the retractable mechanism is driven to release the two cable belts or ropes from the left armrest part, the exposed parts of the two first cable belts or ropes become shorter, wherein each of the plurality of first cable belts or ropes comprises a first quick connector disposed at an end thereof away from the left armrest part;

a left roller part integrally formed by welding a plurality of metal tubes, comprising rollers pivotally connected to a bottom side thereof adjacent to a front end and a rear end thereof, and comprising a top side connected to the bottom side of the left armrest part by a plurality of vertical support rods, so that the left roller part and the left armrest part are spaced apart from each other by a predetermined vertical distance;

a right support member formed by welding and assembling a plurality of metal tubes, and comprising:

a right armrest part disposed on a top edge of the right support member, and comprising a top side configured to place the sitting person's right hand, other retractable mechanism disposed inside, and other rotatable connector pivotally connected to an inner side or an outer side thereof adjacent to a front end thereof and engaged with an end of other rotatable handle, wherein when the other rotatable connector is rotated, the other retractable mechanism is driven to retrieve two first cable belts or ropes exposed out of a bottom side of the right armrest part, into the right armrest part, and the exposed parts of the two first cable belts or ropes become shorter, or when the other rotatable connector is rotated, the other retractable mechanism is driven to release the two cable belts or ropes from the right armrest part, the exposed parts of the two first cable belts or ropes become longer, wherein each of the plurality of first cable belts or ropes comprises a first quick connector disposed at an end thereof away from the right armrest part;

a right roller part integrally formed by welding a plurality of metal tubes, comprising other rollers pivotally connected to a bottom side thereof adjacent to a front end and a rear end thereof, and comprising a top side connected to the bottom side of the right armrest part by a plurality of vertical support rods, so that the right roller part and the right armrest part are spaced apart from each other by the predetermined vertical distance;

a chair seat comprising second cable belts or ropes respectively disposed at left and right sides thereof adjacent to front and rear edges thereof, and each of the plurality of second cable belts or ropes comprising a second quick connector disposed at an end thereof away from the chair seat and configured to integrally engage with one of the first quick connectors corresponding thereto, so that the chair seat is swingably suspended between and below the left armrest part and the right armrest part stably; and two horizontal assembly frames formed by welding at least one metal tube, and comprising ends pivotally connected with parts of the vertical support rods which are adjacent to bottoms of the vertical support rods, and respectively between the left armrest part and the left roller part, and between the right armrest part and the right roller part, wherein other ends of the horizontal assembly frames are mounted with each other, and tightly packed by a quick packing connector (PC), so that the horizontal assembly frames are assembled and combined with each other to form a horizontal bottom support member.

2. The transport aid according to claim 1, further comprising a headrest support member formed by welding and assembling a plurality of metal tubes, wherein the headrest support member comprises:

a left handle part detachably assembled with the top side of the left armrest part adjacent to the rear end of the left armrest part, and other end bent backwardly and downwardly to form a left handle;

a right handle part detachably assembled with the top side of the right armrest part adjacent to the rear end of the right armrest part, and other end bent backwardly and downwardly to form a right handle;

two horizontal handle assembly rods comprising ends respectively welded on near-center sections of the left handle part and the right handle part, and other ends mounted with each other and tightly packed by a quick packing connector (PC), so as to form a horizontal headrest support rod; and a headrest comprising other quick packing connector (PC) disposed at the back surface thereof and configured to mount and tightly pack with the horizontal headrest support rod, to adjust a position and angle of the headrest relative to the horizontal headrest support rod.

3. The transport aid according to claim 1, further comprising two pedals pivotally connected to inner sides of the left roller part and the right roller part adjacent to front edges of the left roller part and the right roller part, respectively.

4. The transport aid according to claim 2, further comprising two pedals pivotally connected to inner sides of the left roller part and the right roller part adjacent to front edges of the left roller part and the right roller part, respectively.

5. The transport aid according to claim 3, wherein each of the rollers comprises a brake mechanism configured to stop rotation of the roller.

6. The transport aid according to claim 4, wherein each of the rollers comprises a brake mechanism configured to stop rotation of the roller.

7. The transport aid according to claim 5, wherein the chair seat comprises a hollow frame and a covering layer, and the hollow frame is formed by a bent metal tube, and the covering layer is made of textile, and the ends of the second cable belts or ropes are respectively sewn and fixed with left and right sides of the covering layer adjacent to front and rear edges of the covering layer.

8. The transport aid according to claim 6, wherein the chair seat comprises a hollow frame and a covering layer, and the hollow frame is formed by a bent metal tube, and the covering layer is made of textile, and the ends of the second cable belts or ropes are respectively sewn and fixed with left and right sides of the covering layer adjacent to front and rear edges of the covering layer.

9. The transport aid according to claim 7, further comprising locking buttons respectively disposed on the vertical support rods adjacent to the bottom of the vertical support rod, and between the left armrest part and the left roller part, and between the right armrest part and the right roller part, wherein each of the locking buttons is configured to rotate to lock and position one of the horizontal assembly frames corresponding thereto, at a horizontally-assembled status, or position one of the horizontal assembly frames corresponding thereto when the horizontal assembly frames are vertically attached with the vertical support rods respectively.

10. The transport aid according to claim 8, further comprising locking buttons respectively disposed on the vertical support rods adjacent to the bottom of the vertical support rod, and between the left armrest part and the left roller part, and between the right armrest part and the right roller part, wherein each of the locking buttons is configured to rotate to lock and position one of the horizontal assembly frames corresponding thereto, at a horizontally-assembled status, or position one of the horizontal assembly frames corresponding thereto when the horizontal assembly frames are vertically attached with the vertical support rods respectively.

* * * * *